Sept. 22, 1925.                                                                 1,554,960
R. B. FEHR
RAIL JOINT AND PLATE THEREFOR
Filed Nov. 24, 1924                    2 Sheets-Sheet 2

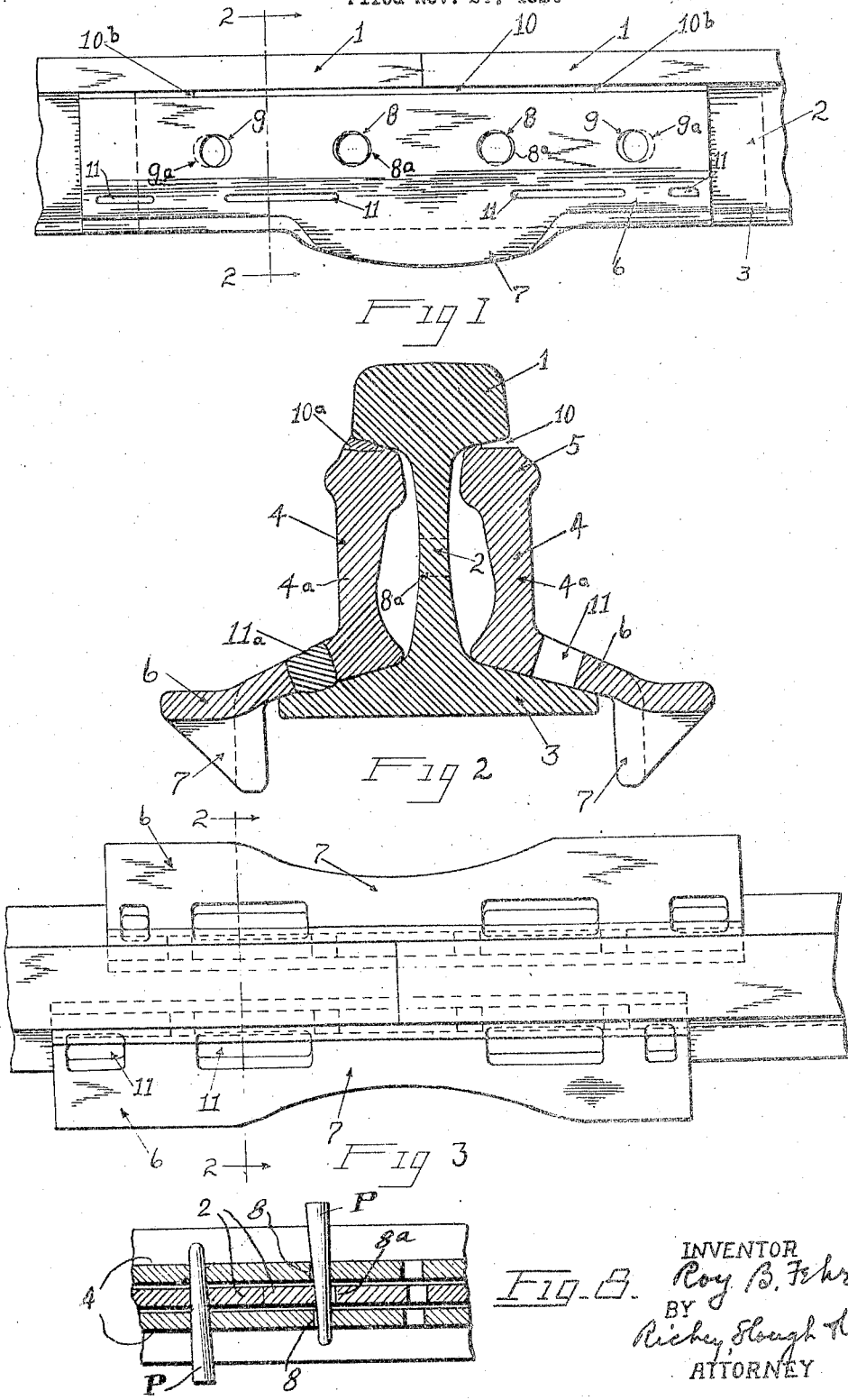

INVENTOR
Roy B. Fehr
BY
Richy, Slough & Watts
ATTORNEY

Patented Sept. 22, 1925.

1,554,960

UNITED STATES PATENT OFFICE.

ROY BENNER FEHR, OF CLEVELAND, OHIO, ASSIGNOR TO RAIL WELDING & BONDING COMPANY, OF CLEVELAND, OHIO, A CORPORATION OF DELAWARE.

RAIL JOINT AND PLATE THEREFOR.

Application filed November 24, 1924. Serial No. 751,861.

*To all whom it may concern:*

Be it known that I, ROY B. FEHR, a citizen of the United States, residing at Cleveland, in the county of Cuyahoga and State of Ohio, have invented certain new and useful Improvements in Rail Joints and Plates Therefor, of which the following is a specification.

This invention relates to welded rail joints and parts thereof.

It also relates to a rail joint plate combining a relatively stiff base flange provided with seam metal positioning means remote from the lateral edges thereof.

It also relates to a rail joint plate having a relatively high section modulus and provided with means for positioning seam metal in welding engagement with a rail head, and with a rail base remote from the edge thereof.

It further relates to a rail joint having improved physical properties including strength, life and resistance to fatigue and composed of a new and improved combination of strength-giving features, practices and parts.

It still further relates to a new and improved method of producing a rail joint having the foregoing properties and characteristics.

Rail joints as constructed prior to my invention have sometimes broken in the welded seams and at the ends of the rails through the middle of the plates under the forces produced on the joint by a car passing over the rails, and which also caused excessive stresses in the seam welds. The section modulus of the plates was limited by the desire to stop the base portion or flanges of the joint plates short of the edges of the rail base so that weld metal could be positioned over a relatively thick part of the rail base for securing the plate on the base.

I have, however, provided a new and improved joint plate for a welded rail joint in which is combined a relatively high section modulus particularly at and adjacent to the ends of the rails where the maximum bending moment occurs and which has a base flange so shaped as to permit the location of seam welds on the base of the rail remote from the edges thereof.

Other rail breakages have occurred with welded rail joints in the rails at points adjacent to the ends of the joint plates and apparently were due to the flexural stresses being largely concentrated in the rail at the ends of the plates. This source of weakness was apparently made more serious when all the seam welds extended to the ends of unstaggered plates, since, ending in the same vertical plane, they tended to produce what is known as "notching" of the rail in the area of maximum stress. I have avoided such conditions by distributing the stresses in the rail and in practice have accomplished this by staggering the ends of the plates, thereby obtaining a fillet effect and further by staggering the ends of the seam welds and also stopping the welds short of the ends of the plates.

These and other improvements will be pointed out more in detail hereinafter.

In the drawings accompanying this application and forming a part thereof—

Fig. 1 is a side elevation of a rail joint embodying my invention;

Fig. 2 is a cross section taken substantially on line 2—2 of Fig. 1;

Fig. 3 is a top plan view of the joint shown in Fig. 1;

Fig. 8 is an enlarged fragmentary detail showing how tapered pins may be inserted into the openings in the rails and plates to cause mutual endwise compression of the rails.

Figure 4:
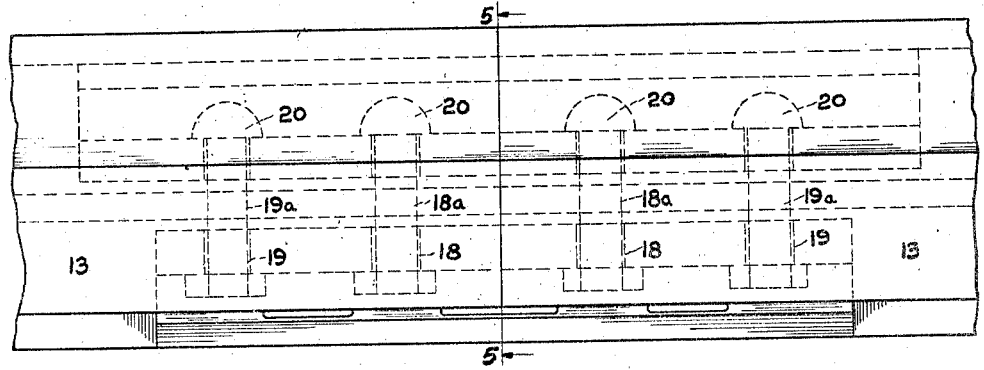
Fig. 4 is a top plan view of a rail joint embodying a modified form of my invention.
Figure 5:
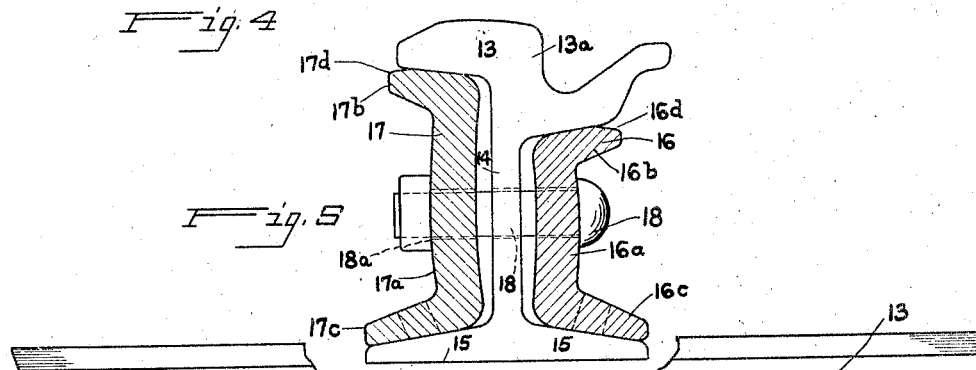
Fig. 5 is a vertical elevation with parts in section as taken on line 5—5 of Fig. 4.
Figure 6:
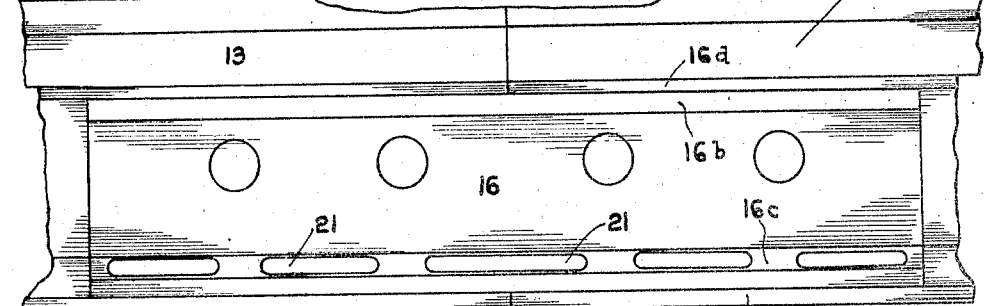
Fig. 6 is a side elevation of the right side of the joint shown in Fig. 5.
Figure 7:
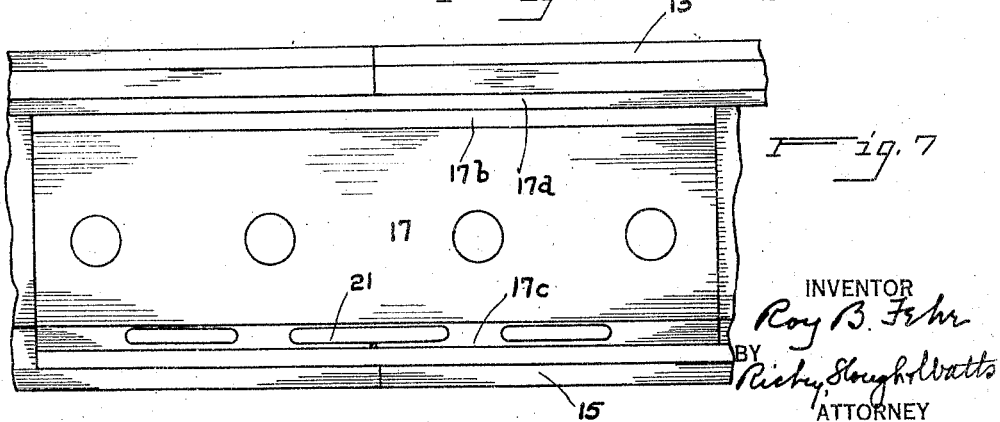
Fig. 7 is an elevational view of the left side of the joint shown in Fig. 5.

Referring first to the form of my invention shown in Figs. 1 and 3, 1 indicates each of two aligned rail ends having substantially abutting engagement. 2 indicates the webs of the rails 1, and 3 the rail bases. Arranged on opposite sides of the rails 1 are joint plates 4 each comprising a web $4^a$, a head engaging portion or flange 5 and a base engaging portion or flange 6. The base flanges 6 of the plates 4 extend toward and beyond the edges of the rail bases 3 and intermediate the ends of the plates are turned downwardly as at 7. The ordinary bolt holes $8^a$ and $9^a$ are provided in the webs 2 of the rails 1, but are slightly out of alignment with the corresponding holes 8 and 9 of the plates 4, as more clearly indicated in Fig. 1. When tapered pins P are inserted in corresponding unaligned holes such as in holes 8 and $8^a$ and driven into the holes sufficiently far to bring the corresponding unaligned holes into substantial alignment, the adjacent ends of the rails 1 become assembled with mutually endwise compression set up in each rail. In this condition securing bolts may be placed in 9 and $9^a$ and nuts tightened thereon to maintain the rail and base in assembled position while the tapered pins are driven from holes 8 and $8^a$ and replaced by similar bolts.

Each plate 4 is provided along the top surface of the head flange 5 with means for positioning seam weld metal adjacent to the rail head. In the illustration shown this means comprises a substantially horizontal top surface extending back under the rail head and forwardly of the rail head to form a ledge. Each plate 4 is provided in the base flange 6 with means for maintaining weld metal on the rail base remote from the edge of the base. This means is illustrated as spaced perforations 11 elongated in a direction lengthwise of the plates and preferably inclined at an angle to the web $4^a$ to the plates 4, as shown. Additional perforations may be made through the flanges 6 at points adjacent to the ends of the rails 1, if desired.

After the plates and rails have been assembled, as above described, the plates may be united to the rails by seam weld metal $10^a$ formed between the head of the rail and the head flange 5 of the plates and by weld metal $11^a$ formed in perforations 11 and resting on the bases of the rails. I prefer to stop the seam weld metal $10^a$ short of each end of the plate 4, as indicated at $10^b$ in Fig. 1.

It will be seen that this seam weld metal is thus disposed remote from the ends of the plates and the weld metal $11^a$ is also disposed remote from the edges of the rail bases.

By referring to Fig. 3, it will be noted that the ends of the plates are shown as being staggered transversely of the rail so that the ends of the plates are not in alignment. In this manner a fillet effect is obtained not only between the rails and the ends of the staggered plates but also between the rails and plates and the seam welds which are also staggered.

It will be noted that plates 4 are substantially similar but are unsymmetrical as regards the downturned flange 7 and the perforations 11. By reason of this unsymmetrical arrangement the plates need not be made in pairs but yet are automatically staggered to a predetermined amount when assembled to form a joint.

Referring now to Figs. 4 to 7, inclusive, wherein I have illustrated a modified form of rail joint embodying my invention, 13 indicates each of two aligned substantially abutting rail ends, each having a head $13^a$, a web 14 and base flanges 15. On opposite sides of the rails channeled joint plates 16 and 17 are disposed, the plates having, respectively, a web $16^a$ and $17^a$, which webs may be slightly bowed or arched as shown if desired, a head flange $16^b$ and $17^b$ and base flanges $16^c$ and $17^c$. The webs 14 have the ordinary bolt holes $18^a$ and $19^a$ extending therethrough substantially as shown and corresponding to holes $8^a$ and $9^a$ shown in Fig. 1, while the webs of plates 16 and 17 are similarly formed with corresponding holes 18 and 19 corresponding to the holes 8 and 9 of Fig. 1, the holes preferably being misaligned in substantially the same respect as is shown in Fig. 1 and described hereinabove. Bolts 20 are shown securing the plates and rails in the assembled position with the rail ends being under mutual endwise compression.

The base flanges of the plates 16 and 17 are shown as being strengthened intermediate their ends and adjacent to the meeting ends of the rails 13 by being extended laterally some distance from the webs $16^a$ and $17^a$ and in this modification this extension is continued for substantially the entire length of the plates. The base flanges $16^c$ and $17^c$ extend toward and preferably substantially flush with the edges of the base 15 of the rail. Means in the form of inclined portions $16^d$ and $17^d$ extending well beneath the adjacent rail head to form a recess and preferably extending forwardly of said head to form a ledge are shown as provided on the top head flanges $16^b$ and $17^b$ to position seam weld metal in contact between the plates and the heads of the rails 13. Means are provided in the base flanges of the plates for positioning seam weld metal remote from the ends of the plates and from the edges of the rail bases in the form of perforations 21 extending through the flanges to expose the rail bases. The plates 16 and 17 are preferably assembled with the rails 13 so that their ends are staggered when viewed transversely of the rail, as shown in Fig. 4. In addition to such staggering I prefer to make one of the plates somewhat shorter than the other and to employ a short plate and a long plate in pairs in each joint. In this manner automatic staggering of the ends of the plates is provided for and considerable material saved in the construction of the short plates.

In the modification shown in Figs. 4 to 7, the fillet effect between the ends of the plates and the rail is obtained, as described in connection with the modification shown in Figs. 1 to 3, and by stopping the seam weld metal short of the ends of the head flanges 16$^b$ and 17$^b$ of the plates a corresponding fillet effect may be obtained between the rail and seam weld metal.

It will be noted that due to the extended flanges 16$^b$, 16$^c$, 17$^b$ and 17$^c$ the plates 16 and 17 are provided with large areas for fishing contact with both the rail head and rail base. A further advantage inherent in plates having channel section or top flanges extending outwardly beyond the track bolts and nuts as shown is that a defining bar when used in welding is thereby positioned out of contact or even close proximity to the bolts and nuts which often interfere with the bar in other types of joint plates. The configuration of the surfaces 16$^d$ and 17$^d$ of the plates facilitates the formation of seam weld metal to join the plates to rail heads inasmuch as ample space is provided between these surfaces and the adjacent upright surfaces of the rail into which the flame of the electric arc may readily be directed, as will be understood by those skilled in the art.

Having thus described my invention so that those skilled in the art may practice the same, what I desire to secure by Letters Patent is defined in what is claimed, it being understood that various changes in the details of the modifications shown and described hereinabove may be made without departing from the spirit of my invention.

What is claimed is:—

1. The method of constructing a seam welded rail joint which comprises aligning adjacent rail ends, fitting joint plates in fishing relation on opposite sides of the rail ends, said plates having a rail base engaging flange extending toward the outer edge of the rail base, and having perforations therethrough to expose the rail base remote from the edge thereof, bringing the rail heads together under moderate mutual endwise compression, and forming seam welds integrally uniting the rail heads to the adjacent portions of the joint plates, and disposing weld metal in the plate perforations integrally uniting the plates to the rail bases.

2. The method of constructing a seam welded rail joint which comprises aligning adjacent rail ends, fitting in fishing relation on opposite sides of the rail ends joint plates each having a surface along the top edge thereof extending well beneath the adjacent rail head to form a recess and extending forwardly of the rail head to form a ledge, said plates each having a rail base engaging flange extending toward the outer edge of the rail base, each said rail base engaging flange having perforations therethrough to expose the rail base remote from the edge thereof, and fusing with the electric arc adjacent portions of the rail head and the upper surface of each plate and fusing therewith additional metal to form a seam weld disposed in the recess and on the ledge and integrally united to the rail head and plate, and fusing the portions of the rail bases exposed through the perforations in the plates and the adjacent sides of the perforations and fusing therewith additional metal to form welds integrally uniting said rail bases and plates.

3. The method of constructing a seam welded rail joint which comprises aligning adjacent rail ends, fitting in fishing relation on opposite sides of the rail ends joint plates having their ends unaligned and holes therethrough, said holes being slightly unaligned with corresponding holes in the rail ends, each said plate having a surface along the top edge thereof extending well beneath the adjacent rail head to form a recess and extending forwardly of the rail head to form a groove, said plates each having a rail base engaging flange extending toward the outer edge of the rail base, each said rail base engaging flange having perforations therethrough to expose the rail base remote from the edge thereof, driving drift pins through slightly unaligned holes in the plates and rail ends to bring the rail heads together under moderate mutual endwise compression, and fusing with the carbon arc adjacent portions of the rail head and the upper surface of each plate and fusing therewith additional metal to form a seam weld disposed in the recess and on the ledge and integrally united to the rail head and to the plate, each said seam weld stopping short of the ends of the plate, the said seam welds ending in different vertical planes, and fusing the portions of the rail bases exposed through the perforations in the plates and the adjacent sides of the perforations and fusing therewith additional metal to form welds integrally uniting said rail bases and plates.

4. A seam welded rail joint comprising aligned adjacent rail ends, joint plates arranged on opposite sides of the rail ends, each plate having a rail base engaging flange extending toward the outer edge of the rail base, each said flange having perforations therein remote from the edge thereof and weld metal in said perforations integrally united to the portions of the rail base beneath said perforations and integrally united to the edges of said perforations.

5. A seam welded rail joint comprising aligned adjacent rail ends, joint plates arranged on opposite sides of the rail ends engaging the heads and bases of the rails in fishing relation, each plate having a rail base engaging outwardly extending flange having a central portion extending beyond the edge of the rail base, said flange having perforations therein remote from the edge thereof, weld metal in said perforations integrally united to the portions of the rail base beneath said perforations and integrally united to the edges of said perforations, said plates being integrally united to the adjacent rail heads by seam welds.

6. A seam welded rail joint comprising aligned adjacent rail ends, joint plates arranged with their ends unaligned on opposite sides of the rail ends engaging the heads and bases of the rails in fishing relation, said joint plates each having a surface along the top edge thereof extending well beneath the adjacent rail head to form a recess and extending forwardly of the rail head to form a ledge, said plates each having a rail base engaging flange extending toward the outer edge of the rail base, each said rail base engaging flange having elongated perforations therethrough remote from the edge thereof, weld metal in said perforations integrally united to the portions of the rail base beneath said perforations and integrally united to the edges of said perforations, seam weld metal in each said recess and on each said ledge integrally united to the said plates and rail heads.

7. A seam welded rail joint comprising aligned adjacent rail ends, channel shaped joint plates arranged on opposite sides of the rail ends engaging the heads and bases of the rails in fishing relation, each said plate having a surface along the top edge thereof extending well beneath the adjacent rail head to form a recess and extending forwardly of the said head to form a ledge, each plate having a rail base engaging flange extending toward the outer edge of the rail base, each said rail base engaging flange having elongated perforations therethrough remote from the edge thereof, weld metal in said perforations integrally united to the portions of the rail base beneath said perforations and integrally united to the edges of said perforations, seam weld metal in each said recess and on each said ledge integrally united to the said plates and rail heads.

8. A seam welded rail joint comprising aligned adjacent rail ends, joint plates arranged on opposite sides of the rail ends engaging the heads and bases of the rails in fishing relation and having their ends unaligned, each said plate having a surface along the top edge thereof extending well beneath the adjacent rail head to form a recess and extending forwardly of the said head to form a ledge, each plate having a rail base engaging flange extending toward the outer edge of the rail base and having elongated perforations therethrough remote from the edge of the rail base, weld metal in said perforations integrally united to the portions of the rail base beneath said perforations and integrally united to the edges of said perforations, seam weld metal in each said recess and on each said ledge integrally united to the said plates and rail heads, said seam welds stopping short of the ends of the plates and ending in different vertical planes.

9. A seam welded rail joint comprising aligned adjacent rail ends, joint plates arranged on opposite sides of the rail ends engaging the heads and bases of the rails in fishing relation and having their ends unaligned, each said plate having a surface along the top edge thereof extending well beneath the adjacent rail head to form a recess and extending forwardly of the said head to form a ledge, each plate having a rail base engaging portion extending laterally well beyond the edge of the rail base and bent down intermediate the ends of the plate and having elongated perforations through the rail base engaging portion remote from the edge of the rail base, weld metal in said perforations integrally united to the portions of the rail base beneath said perforations and integrally united to the edges of said perforations, seam weld metal in each said recess and on each said ledge integrally united to the said plates and rail heads, said seam welds stopping short of the ends of the plates and ending in different vertical planes.

10. A joint plate for a welded rail joint having an integrally formed rail base engaging outwardly extending flange having perforations therein to expose the rail base remote from the edge thereof.

11. A joint plate for a welded rail joint having a top weld metal receiving surface adapted to extend well beneath the adjacent rail head to form a recess and forwardly of said head to form a ledge and having an integrally formed rail base engaging outwardly extending flange having perforations therein to expose the rail base remote from the edge thereof.

12. A joint plate for a welded rail joint, said plate being channel shaped in cross section and having a top surface adapted to extend well beneath an adjacent rail head to form a recess and forwardly of said head to form a ledge and having a rail base engaging outwardly extending flange having elongated perforations therein to expose the rail base remote from the edge thereof and adapted to receive weld metal.

13. A joint plate for a welded rail joint having a top surface for supporting weld metal in contact with the side and under surface of a rail head and having a rail base engaging flange extending laterally well beyond the edge of the rail base and bent downwardly intermediate the ends thereof and having perforations therein to expose the rail base remote from the edge thereof.

14. A joint plate for a welded rail joint having a top surface adapted to extend well beneath an adjacent rail head to form a recess and forwardly of said head to form a ledge and having a rail base engaging outwardly extending flange with perforations therethrough to expose the rail base remote from the edge thereof, said plate having reinforcing means intermediate the ends thereof.

15. A joint plate for a welded rail joint having a top surface adapted to extend well beneath an adjacent rail head to form a recess and forwardly of said head to form a ledge and having a rail base engaging portion adapted to extend laterally well beyond the edge of the rail base and bent down intermediate the ends thereof, said rail base engaging portion having perforations therethrough to expose the rail base remote from the edge thereof.

In testimony whereof I hereunto affix my signature this 4th day of November, 1924.

ROY BENNER FEHR.